United States Patent [19]

Fuchs et al.

[11] Patent Number: 4,475,423
[45] Date of Patent: Oct. 9, 1984

[54] SHEAR FOR CUTTING ROD-FORM MATERIAL

[75] Inventors: Ernst Fuchs; Karl Rimmele, both of Schmerikon; Hans Bieri, Pfäffikon, all of Switzerland

[73] Assignee: Mecapec S.A., Switzerland

[21] Appl. No.: 377,432

[22] Filed: May 12, 1982

[30] Foreign Application Priority Data

May 19, 1981 [DE] Fed. Rep. of Germany ....... 3119881

[51] Int. Cl.³ ...................... B23D 23/00; B23D 15/00
[52] U.S. Cl. ........................................ 83/199; 83/196
[58] Field of Search ................................ 83/199, 196

[56] References Cited

U.S. PATENT DOCUMENTS 3,664,221 5/1972 Breetvelt ............................... 83/196
4,385,538 5/1983 Bieri et al. ............................. 83/196

Primary Examiner—Donald R. Schran
Attorney, Agent, or Firm—Yount & Tarolli

[57] ABSTRACT

In shears for rod-form material, especially in connection to roll trains, the problem exists of a space-saving construction, especially in the sidewise direction, in view of the multiple arrangements, as well as increased safety (reliability) of operation for the high-pressure hydraulic system of the cutting drive.

The shear provided with two knife holders (MT1, MT2) and a fluid drive element (ZK) as well as a respective pressure feeding device (DS), is so designed, for this purpose, that the pressure work chambers (DA1, DA2) of the drive element, such as a double-acting cylinder-piston arrangement, and the elements carrying pressure fluid (high-pressure pumps, etc.) of the pressure feeding device (DS) are designed to be movable in common with a knife holder (MT1) which is movable in relation to the machine frame or a conduction (SF) of material to be cut, and preferably fixed in space with this latter (MT1).

12 Claims, 3 Drawing Figures

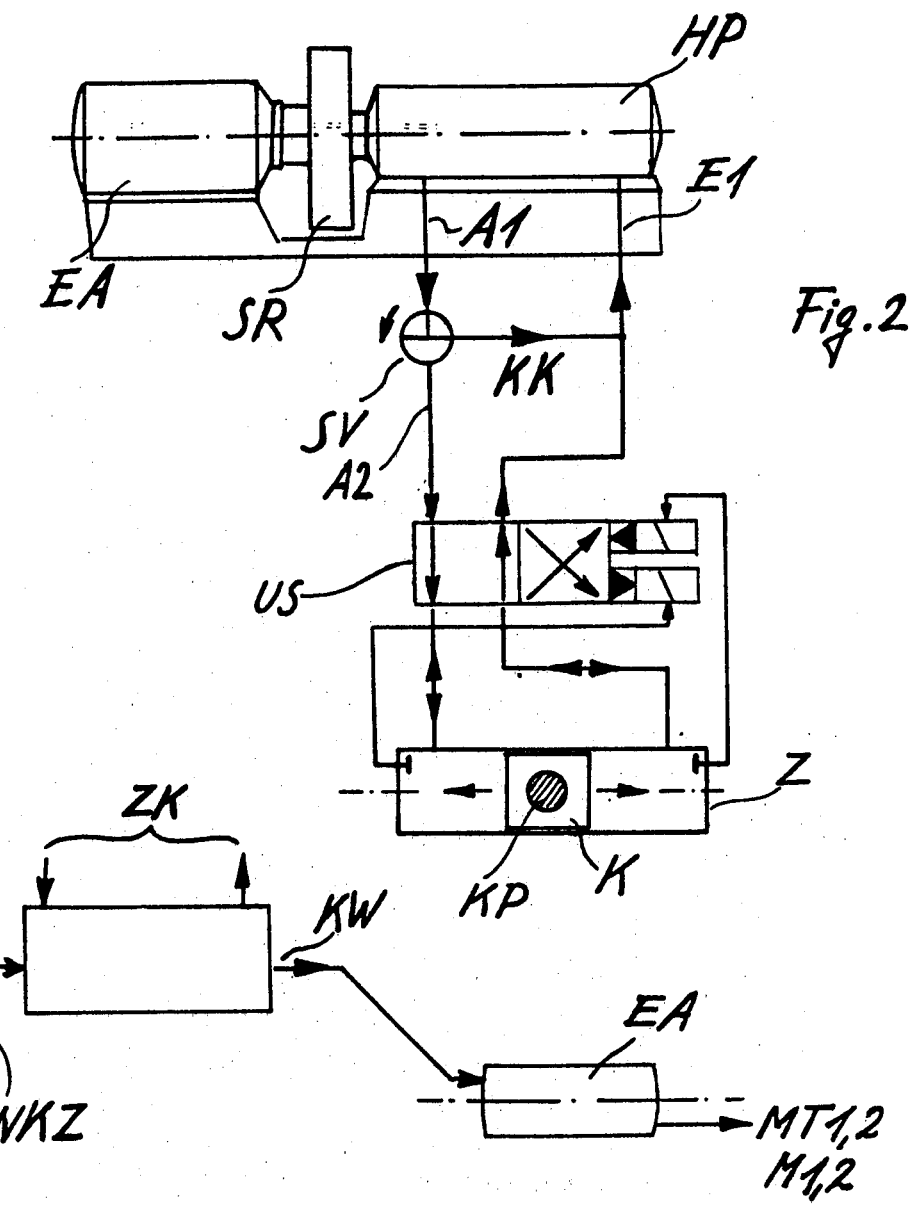

SHEAR FOR CUTTING ROD-FORM MATERIAL

The invention concerns a shear for rod-form material. Such shears are used in particular for the cutting up or cutting to length of rolled profile rods, connected to roll trains.

One shear of the kind mentioned is known from British Pat. No. 928,817. There, two knife holders are supported so that they can pivot in relation to each other, and are in working connection with a cylinder-piston arrangement as drive device for the cutting process. The cylinder-piston arrangement is connected so that it can pivot with both knife holders, so that the cylinder axis can be displaced according to the work pivoting movement. Accordingly, the pressure work chambers of the cylinder-piston arrangement are moved in relation to both knife holders and to the machine frame, which results in the need for movable couplings in the course of the pressure feed lines between the fluid pressure feeding device and the work chambers. In case of the use of pressure hoses, this is associated with a decrease of operation safety (reliability), which is especially serious with the usual feeding of oil, because of the danger of fire and pollution, and in the case of the use of joint couplings or the like, this is associated with increased construction expense and susceptibility to wear. The usual design of such shears is also associated with a wide unloading construction, sidewise of the conduction of material to be cut, which with the arrangement on multiple roll trains or other parallel processing stations, leads to space difficulties.

The problem of the invention, therefore, is to provide a rod shear which is distinguished by increased reliability in operation, with comparatively low construction cost, and of which the construction favors a space-saving design, sidewise of the material to be cut.

According to this, the common mobility of the parts of the drive element carrying pressure fluid, generally a cylinder-piston arrangement, with the knife holders, movable in relation to the conduction of material to be cut, in combination with a corresponding design of the respective pressure feeding device, makes possible a completely stationary arrangement of the pressure lines, without movable couplings or hoses. A space-saving construction is also favored by the simplified structure.

Other features and advantages of the invention are explained in the example of execution schematically represented in the drawings:

FIG. 2 is a block diagram of the hydraulic system of the pressure feeding device of the shear; and FIG. 3 is a block diagram of the cooling system of the pressure feeding device.

Figure 1:
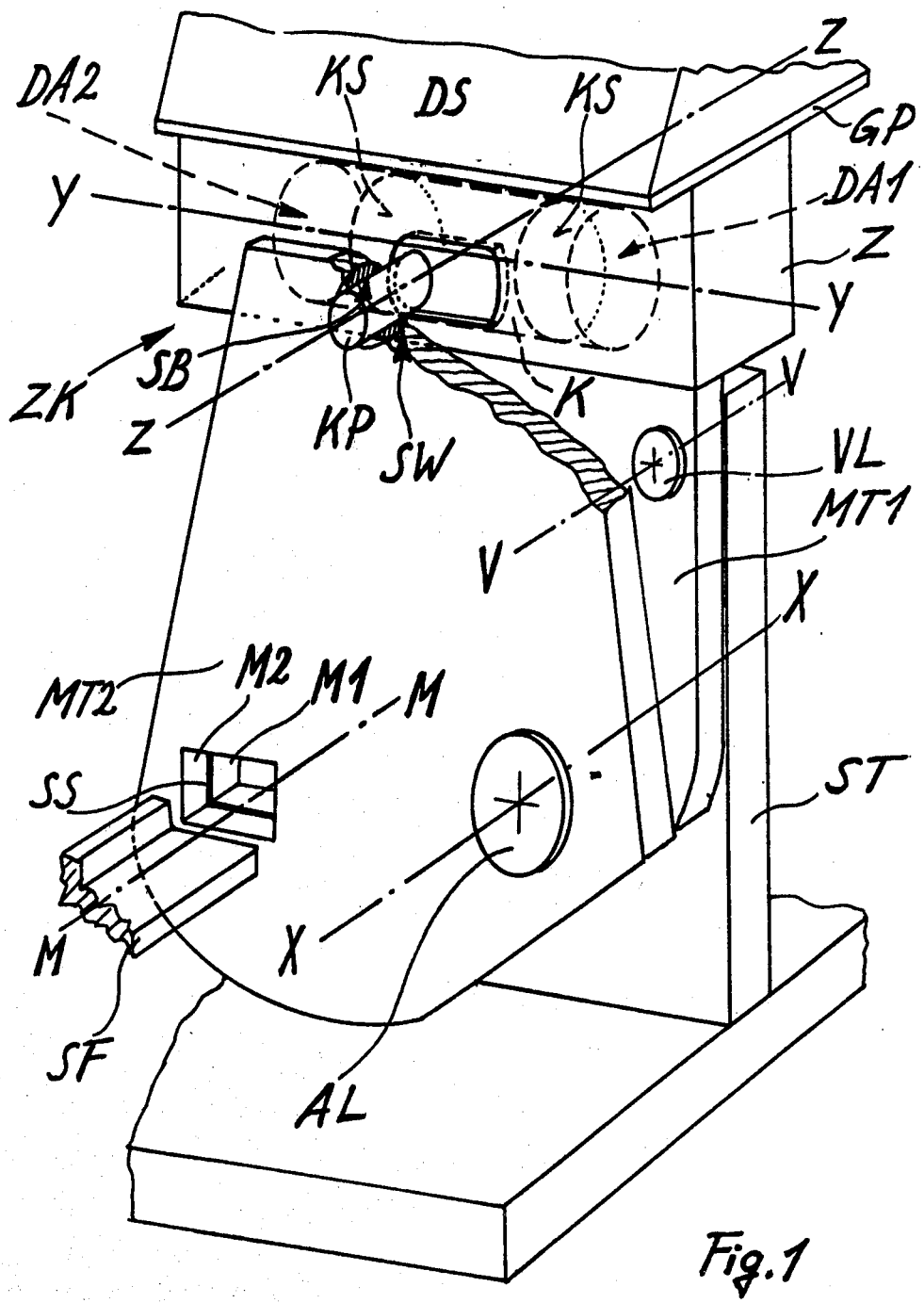
FIG. 1 is a representation in perspective of a rod shear according to the invention.

In the shear represented in FIG. 1, two knife holders MT1 and MT2 are supported so that they can pivot together, by a work bearing AL, with axis X—X, parallel to a conduction SF of the material to be cut. The whole knife-holding arrangement is also supported so that it can pivot around an axis V—V, also parallel to the conduction of the material to be cut, and, with the aid of a fixing drive (gear) not shown, can be swung for the placing of the knife M1 of the first knife holder MT1 on the material to be cut, before the beginning of the cutting process. Then the first knife holder is fixed, in relation to the conduction of material or the machine frame, and the second knife holder MT2 is swung, through a cylinder-piston arrangement ZK, for carrying out the cut, against the first knife holder, the knife M2 being moved upward at the cutting point SS.

The cylinder-piston arrangement is designed doube-action, for the work and return movement, and is provided with the corresponding pressure work chambers DA1, DA2, of opposite action. These chambers, situated in the cylinder Z, impacted by fluid at high pressure, as well as a respective pressure feeding device DS, are rigidly joined in space with the first knife holder. The pressure feeding device is built as a closed construction unit on a base plate GP, which in turn in rigidly connected with the cylinder Z and with the knife holder MT1. Thus, the feeding device, the drive element and the knife holder are joined in one piece and take part in common in the approach pivot movement to place the knife M1 on the material to be cut.

The pressure feeding device DS is, as appears in detail from FIG. 2, provided with a high-pressure pump HP and an electric motor drive assembly EA, as well as a closed fluid drive circuit. Thus, because of the participation of the drive element and the pressure feeding device in the movement of the first knife holder, any moving joining or connecting elements for the high-pressure fluid are eliminated.

The axis Y—Y of the cylinder-piston arrangement ZK is arranged, as shown from FIG. 1, in the upper end zone of the knife holder MT1, and at a distance from, and crosswise of the axis X—X of the work bearing AL, and thus lies substantially horizontal. The horizontal extension of the cylinder-piston arrangement coincides approximately with the corresponding movement of the knife holding device, so that a compact, space-saving construction, sidewise or horizontal, is given.

Moreover, the arrangement of the pressure feeding device DS above the knife-holding arrangement and the cylinder-piston arrangement is of particular advantage, because in this way no space is taken in the zone of the cutting point and of the conveying of the material to be cut, or sidewise of the shear. The pressure feeding device is also limited in its horizontal extent to the zone of the knife holder arrangement and the drive element, which contributes greatly to space saving. The connection of the drive element with the second knife holder MT2 through a coupling KP arranged in the zone of the cylinder Z, as shown from FIG. 1, also contributes greatly to sidewise space saving. This coupling is set onto the double-acting piston K, radial in relation to the axis Y—Y, and is formed of a bolt body, let out through a corresponding opening of the cylinder Z, arranged between the two front ends KS of the piston. In this way, any additional projection to the side as a result of flanged piston rods or joint parts is avoided. For the compensation of the circular relative movements between cylinder Z and knife holder MT2, the corresponding compensation joints in especially simple form are provided. Thus, the piston K, bearing the coupling KP, is supported in the cylinder Z so that it can pivot around the axis Y—Y, which makes possible the necessary radial compensation without an additional joint. In the zone of the connection between coupling and knife holder MT2, then, only a pivot guidw SW in the form of a simple joint, as well as a slide guide SB moved only slightly for the axial compensation is necessary. Finally, it contributes greatly to space saving that, as shown in FIG. 1, this arrangement is in the zone above the work bearing AL, the coupling axis Z—Z being arranged substantially parallel to the axis M—M of the material to be cut, in the zone of the cutting point SS and to the axis X—X of the work bearing AL. In this way are given small movement strokes of the power transmission parts moved in relation to each other, and low moments of rotation in the machine structure.

As shown in detail from FIG. 2, the motor pump assembly EA, HP of the pressure feeding device DS is provided with a flywheel SR or other balancing mass of comparable size, so that there is a high storage of rotation energy. This is transmitted to a closed fluid circuit, running empty in the rest condition, which between the inlet E1 and the outlet A1 of the pump HP runs through a short circuit channel KK with a control valve SV. To begin a cutting process, the control valve is switched, in each case, from its rest position with short circuit channel switched open, into its work position with short-circuit channel blocked and outlet A2 to the drive element ZK open. In this way, greater amounts of oil, such as would otherwise be needed for hydraulic-pneumatic pressure storers, can be omitted. This in particular contributes to reliability (safety) of operation and to the reduction of danger of fire in hot shearing.

The automatic work cycle of the shear is further simplified through a switching device, dependent on the stroke position of the piston, for passage from the advance or cutting process to the return into the rest position.

As shown in FIG. 3, the fluid circuit of the pressure feeding device DS is provided with a cooling heat exchanger KW, which is connected to a low-pressure cooling fluid feed line NKZ. In this way, therefore, no high-pressure connection elements are needed. On the other hand, such a cooling makes possible an especially compact structure of the feeding unit, through safer control of the carrying away of heat from the energy-carrying components; in particular, the use of a fluid-cooled electric motor for the pump drive. In this way, not only are the dimensions of the motor decreased, but rather, above all, the power intensity is improved with the storage of rotation energy. Suitably, for this purpose, the cooling system of the electric motor is connected into the flow of cooling fluid, in series with and after the motor in the flow direction. An advantageous simplification is also given by the fact that a fluid cooling, provided in the case of hot shearing, for the knife-holder arrangement, especially for the knife zone, is connected after, in the flow direction, or in other connection with the cooling system of the feeding device.

We claim:

1. A shear for cutting stock comprising first and second movable cutting blade assemblies including first and second cutting blades respectively, said first cutting blade assembly including a pump for pumping fluid out at a high pressure and cylinder-piston means rigidly interconnected with said pump and operable by said high-pressure fluid to effect movement of said piston, said pump and said cylinder-piston means being rigidly joined to and movable in common with said first cutting blade assembly, and a coupling pin mounted on said piston and received in a guide slot in said second cutting blade assembly to effect movement of said second cutting blade assembly relative to said first cutting blade assembly upon movement of said piston, to thereby cut the stock.

2. A shear as defined in claim 1, wherein said first cutting blade assembly is pivotally mounted on a machine frame and is pivotally movable relative to said frame to bring said first cutting blade into a position in engagement with the stock to be cut, and is fixable in said position.

3. A shear as defined in claim 2, wherein said second cutting blade assembly is pivotally mounted on said first cutting blade assembly to move arcuately relative to said first cutting blade assembly and to move in common with said first cutting blade assembly when said first cutting blade is brought into engagement with the stock to be cut, and means for pivotally moving said first cutting blade assembly and for fixing in place said first cutting blade assembly.

4. A shear as defined in claim 3, wherein said cylinder-piston means comprises a cylinder having a longitudinal axis and a piston coaxially disposed in said cylinder and having said coupling pin extending radially from said piston and outwardly of said cylinder, said piston being free to rotate about the axis of said cylinder to compensate for the arcuate movement of said guide slot when said second cutting blade assembly is pivotally moved to cut the stock.

5. A shear as defined in claim 4, wherein said cylinder-piston means comprises a double-acting cylinder-piston assembly comprising a piston having two end faces and a cylinder having a working chamber at each end of said piston, said coupling pin extending radially from said piston at a location between said piston end faces.

6. A shear as defined in claim 5, further including switching means activated by the stroke position of said piston within said cylinder for automatically controlling flow of high-pressure fluid to said cylinder-piston means.

7. A shear as defined in claim 6 wherein said first cutting blade assembly is pivotally mounted on said machine frame through a work bearing having an axis, and wherein the stock to be cut is fed into the shear in a direction approximately parallel to the axis of said work bearing, said cylinder being disposed approximately horizontally and above said work bearing with the longitudinal axis of said cylinder approximately normal to the axis of said work bearing, said cylinder-piston means having a lateral extent coinciding approximately with the lateral extent of said first and second cutting blade assemblies.

8. A shear as defined in claim 7 wherein said coupling pin is disposed above said work bearing and extends along an axis approximately parallel to the axis of said work bearing and is disposed laterally between said work bearing and said cutting blades.

9. A shear as defined in claim 8 wherein said pump is disposed vertically above said cylinder-piston means and is rigidly connected therewith, and said pump and said electric motor assembly have a lateral extent coinciding approximately with the lateral extent of said first and second cutting blade assemblies.

10. A shear as defined in claim 1, further comprising an electric motor drive assembly for driving said pump and at least one flywheel connected thereto for storing rotational energy.

11. A shear as defined in claim 10, comprising a closed fluid circuit including said pump having an inlet and an outlet, a short-circuit channel between said inlet and said outlet for channelling said high-pressure fluid when the shear is not in operation, a drive circuit for channelling said fluid to operate the shear, and valve means for switching the flow of fluid between said short-circuit channel and said drive circuit.

12. A shear as defined in claim 11, further comprising heat exchanger means including means for circulating low-pressure cooling fluid to cool said high-pressure fluid operating said piston-cylinder means and to cool said electric motor and to cool said first and second cutting blades.

* * * * *